US012654521B2

(12) United States Patent
Delgado Hernandez et al.

(10) Patent No.: US 12,654,521 B2
(45) Date of Patent: Jun. 16, 2026

(54) VEHICLE DOORS INCLUDING REINFORCEMENT MEMBERS

(71) Applicant: Nissan North America, Inc., Franklin, TN (US)

(72) Inventors: Jose Adrian Delgado Hernandez, Toluca (MX); Ernesto Velazquez, Toluca (MX); Diego Armando Dominguez Lopez, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 18/061,694

(22) Filed: Dec. 5, 2022

(65) Prior Publication Data

US 2024/0181851 A1 Jun. 6, 2024

(51) Int. Cl.
*B60J 5/04* (2006.01)

(52) U.S. Cl.
CPC ........... *B60J 5/0451* (2013.01); *B60J 5/0418* (2013.01); *B60J 5/0438* (2013.01); *B60J 5/0463* (2013.01)

(58) Field of Classification Search
CPC ...... B60J 5/0418; B60J 5/0463; B60J 5/0434; B60J 5/0451; B60J 5/042–0462; B60J 5/0438; B60J 1/12; B60R 21/0428; B60R 2021/0006; B60R 2021/0041
See application file for complete search history.

(56) References Cited

U.S. PATENT DOCUMENTS

| | | | | | |
|---|---|---|---|---|---|
| 4,783,114 | A | * | 11/1988 | Welch ...................... | B60N 2/78 280/751 |
| 5,306,066 | A | * | 4/1994 | Saathoff ................. | B60J 5/0451 296/187.05 |
| 5,466,031 | A | * | 11/1995 | Uchida ................... | B60J 5/0451 296/187.05 |

(Continued)

FOREIGN PATENT DOCUMENTS

| | | | | |
|---|---|---|---|---|
| DE | 4020309 | A1 | * 1/1991 | ............. B60R 7/046 |
| DE | 102008011754 | A1 | 9/2009 | |

(Continued)

OTHER PUBLICATIONS

Photograph of vehicle Alliance Internal, Jan. 2019.

*Primary Examiner* — Catherine A Kelly
*Assistant Examiner* — Patrick B. Ponciano
(74) *Attorney, Agent, or Firm* — Young Basile Hanlon & MacFarlane, P.C.

(57) ABSTRACT

A vehicle door is disclosed that includes: an outer panel; an inner panel located inboard of the outer panel; a window channel; a window glass; a structural beam; and a reinforcement member supported by the inner panel and the structural beam so as to inhibit force transmission through the vehicle door during a side impact. The window glass is movable within a window slot collectively defined by the outer panel and the inner panel. The window channel is supported by the inner panel, extends in generally orthogonal relation to the window slot, and is configured to receive the window glass such that the window glass is movable therethrough. The (Continued)

structural beam is supported by the inner panel and defines a longitudinal axis. The structural beam is configured such that the longitudinal axis extends in generally parallel relation to the window slot and in generally orthogonal relation to the window channel.

5 Claims, 10 Drawing Sheets

(56) References Cited

U.S. PATENT DOCUMENTS

| | | | | |
|---|---|---|---|---|
| 5,749,600 | A * | 5/1998 | Yamada | B60J 5/0451 |
| | | | | 296/187.05 |
| 5,865,496 | A * | 2/1999 | Odan | B60R 21/0428 |
| | | | | 280/751 |
| 5,934,730 | A * | 8/1999 | Yagishita | B60J 5/0451 |
| | | | | 296/146.7 |
| 6,237,987 | B1 * | 5/2001 | Babatz | B60J 5/0451 |
| | | | | 296/187.12 |
| 7,121,611 | B2 * | 10/2006 | Hirotani | B60N 2/4235 |
| | | | | 296/187.05 |
| 7,341,277 | B2 * | 3/2008 | Huttsell | B60J 5/0425 |
| | | | | 280/751 |
| 7,568,744 | B2 | 8/2009 | Tenorio et al. | |
| 7,726,727 | B2 * | 6/2010 | Bhattacharjee | B60J 5/0452 |
| | | | | 296/187.05 |
| 9,004,529 | B2 * | 4/2015 | Torii | B60J 5/0452 |
| | | | | 280/730.2 |
| 9,321,331 | B2 * | 4/2016 | Hasegawa | B60J 5/0427 |
| 9,452,727 | B2 * | 9/2016 | Hase | B60J 5/0451 |
| 9,688,123 | B2 * | 6/2017 | Hasegawa | B60J 5/0451 |
| 9,845,000 | B2 * | 12/2017 | Kojima | B60J 5/0402 |
| 11,260,731 | B2 * | 3/2022 | Itou | B60J 5/0418 |
| 11,505,135 | B2 * | 11/2022 | Yamagiwa | B62D 25/06 |
| 12,071,091 | B2 * | 8/2024 | Inagaki | B60R 13/0243 |
| 2001/0017476 | A1 | 8/2001 | Nishikawa et al. | |
| 2005/0189789 | A1 | 9/2005 | Schmidt | |
| 2007/0069532 | A1 | 3/2007 | Tenorio et al. | |
| 2008/0012384 | A1 * | 1/2008 | Sielhorst | B60R 21/04 |
| | | | | 296/146.7 |
| 2008/0246309 | A1 | 10/2008 | Abe | |
| 2010/0109379 | A1 | 5/2010 | Abe | |
| 2011/0169302 | A1 | 7/2011 | Deng et al. | |
| 2014/0049058 | A1 | 2/2014 | Kudoh et al. | |
| 2015/0224858 | A1 * | 8/2015 | Yoshimoto | E05B 79/06 |
| | | | | 292/336.3 |
| 2020/0238798 | A1 | 7/2020 | Kovie et al. | |
| 2020/0248487 | A1 | 8/2020 | Muta et al. | |
| 2020/0248488 | A1 * | 8/2020 | Muta | B60J 5/0429 |
| 2021/0237543 | A1 * | 8/2021 | Itou | B60J 5/0415 |
| 2022/0105787 | A1 * | 4/2022 | Estrada Lagunas | E05F 15/689 |
| 2025/0033443 | A1 * | 1/2025 | Ochoa | B60J 5/0413 |

FOREIGN PATENT DOCUMENTS

| | | | | | |
|---|---|---|---|---|---|
| DE | 102016008585 | A1 | | 2/2017 | |
| JP | H0733932 | Y2 * | 8/1995 | | B60J 5/0447 |
| JP | 2549364 | Y2 * | 9/1997 | | |
| JP | 2975184 | B2 * | 11/1999 | | |
| KR | 200151080 | Y1 * | 3/1997 | | |
| RU | 180276 | U1 | 6/2018 | | |

* cited by examiner

VEHICLE DOORS INCLUDING REINFORCEMENT MEMBERS

TECHNICAL FIELD

The present disclosure relates to vehicle doors and, more specifically, to vehicle doors that include reinforcement members to reduce force transmission in the event of a side impact.

BACKGROUND

In the event of a side impact with a vehicle, forces are often applied to one or more of the vehicle doors, which can result in deformation, deflection, or other such damage to one or more of the (internal) components thereof.

In an effort to address this issue, the present disclosure describes vehicle doors that include one or more reinforcement members, which are configured to absorb the forces that are applied during a side impact in order to inhibit force transmission through the vehicle door(s) and thereby reduce deformation, deflection, or other such damage.

SUMMARY

In one aspect of the present disclosure, a vehicle door is disclosed that includes: an outer panel; an inner panel; a window channel; a structural beam; and a reinforcement member. The inner panel is located inboard of the outer panel and defines a window opening that is configured to receive a window glass such that the window glass is movable within a window slot collectively defined by the outer panel and the inner panel. The window channel is supported by the inner panel and extends in generally orthogonal relation to the window slot. The window channel is configured to receive the window glass such that the window glass is movable therethrough. The structural beam is supported by the inner panel and defines a forward end, a rear end, and a longitudinal axis that extends therebetween. The structural beam is configured such that the longitudinal axis extends in generally parallel relation to the window slot and in generally orthogonal relation to the window channel. The reinforcement member is supported by the inner panel and the structural beam and is configured to inhibit force transmission through the vehicle door during a side impact.

In certain embodiments, the vehicle door may further include a handle assembly that is configured to facilitate opening and closure of the vehicle door.

In certain embodiments, the reinforcement member may be positioned vertically above the handle assembly and rearwardly of the window channel in adjacent relation thereto.

In certain embodiments, the reinforcement member may be directly supported by the inner panel and the structural beam.

In certain embodiments, the reinforcement member may be in physical contact with the inner panel and the structural beam.

In certain embodiments, the reinforcement member may be configured for positioning between the inner panel and the structural beam in an interference fit.

In certain embodiments, the reinforcement member may be solid in construction and may be devoid of any openings extending therethrough.

In certain embodiments, the inner panel may define a first mounting surface that is configured for engagement with the reinforcement member and a receptacle that is configured to receive the reinforcement member such that the reinforcement member extends into the inner panel, whereby the inner panel supports the reinforcement member and inhibits movement thereof along a first axis and a second axis that extends in generally orthogonal relation to the first axis.

In certain embodiments, the structural beam may define a second mounting surface that is configured for engagement with the reinforcement member to thereby support the reinforcement member and inhibit movement thereof along the first axis and the second axis.

In certain embodiments, the structural beam may include a support member that is configured to receive the reinforcement member to thereby further support the reinforcement member and further inhibit movement thereof along the first axis and the second axis.

In certain embodiments, the reinforcement member may include a first guard that is configured for engagement with the structural beam and a second guard that is configured for engagement with the inner panel.

In certain embodiments, the first guard and the second guard may each include a deformable material to reduce noise and facilitate positioning of the reinforcement member between the structural beam and the inner panel in the interference fit.

In another aspect of the present disclosure, a reinforcement member is disclosed for a vehicle door. The reinforcement member includes: a main body portion; a first guard that is located at an outboard end of the reinforcement member; and a second guard that is located at an inboard end of the reinforcement member. The main body portion includes an irregular octagonal cross-sectional configuration and defines: an upper inboard side wall; a lateral wall that extends outboard from the upper inboard side wall; a lower inboard side wall that extends from the lateral wall; a lower end wall that extends outboard from the lower inboard side wall; a lower beveled wall that extends from the lower end wall; an outboard side wall that extends from the lower beveled wall; an upper beveled wall that extends from the outboard side wall; and an upper end wall that extends inboard from the upper beveled wall such that the upper end wall extends between the upper beveled wall and the upper inboard side wall.

In certain embodiments, the first guard may extend from the upper end wall to a point located between the upper end wall and the lower beveled wall.

In certain embodiments, the first guard may include a first segment that is secured to the upper beveled wall and a second segment that is secured to the outboard side wall.

In certain embodiments, the upper inboard side wall, the lateral wall, and the lower inboard side wall may be configured to define an overhang that extends inboard such that the reinforcement member is supportable by an inner panel of the vehicle door.

In certain embodiments, the second guard may include a third segment that is secured to the upper inboard side wall and a fourth segment that is secured to the lateral wall such that the second guard is positionable between the lateral wall and the inner panel of the vehicle door.

In another aspect of the present disclosure, a method of assembling a vehicle door is disclosed. The method includes: positioning a window glass between an inner panel and an outer panel of the vehicle door such that the window glass is movable along an axis of movement; connecting a structural beam to the inner panel such that a longitudinal axis defined by the structural beam extends in generally orthogonal relation to the axis of movement; and positioning a reinforcement member between the inner panel and the structural beam such that the reinforcement member inhibits force transmission through the vehicle door during a side impact.

In certain embodiments, positioning the reinforcement member may include creating an interference fit between the reinforcement member, the inner panel, and the structural beam.

In certain embodiments, positioning the reinforcement member may include rotating the reinforcement member into a chamber defined between the inner panel and the structural beam from an elevated position above the inner panel and the structural beam.

In certain embodiments, positioning the reinforcement member may include inserting the reinforcement member into a receptacle that is defined by the inner panel such that the reinforcement member extends into the inner panel.

In certain embodiments, positioning the reinforcement member may include causing engagement between the reinforcement member and a support member on the structural beam.

In certain embodiments, positioning the reinforcement member may further include causing contact between an inboard end of the reinforcement member and a first mounting surface that is defined by the inner panel and causing contact between an outboard end of the reinforcement member and a second mounting surface that is defined by the structural beam, whereby the inner panel and the structural beam collectively support the reinforcement member and inhibit movement thereof along a first axis and a second axis that extends in generally orthogonal relation to the first axis.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
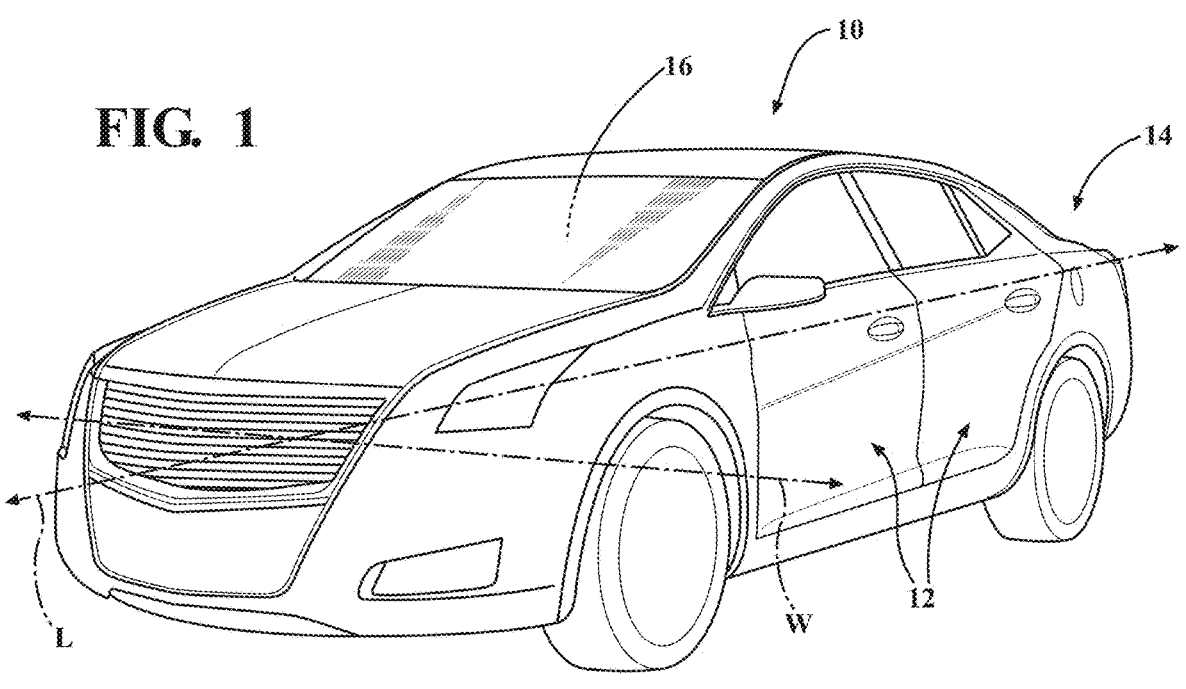
FIG. 1 is a front, perspective view of a vehicle include vehicle doors according to the principles of the present disclosure.

The present disclosure describes a vehicle door that includes one or more reinforcement members, which are configured to absorb the forces that are applied during a side impact in order to inhibit force transmission through the vehicle door and thereby reduce deformation, deflection, or other such damage. The reinforcement member(s) described herein utilize the existing geometry of the vehicle door and are configured for positioning between an inner panel of the vehicle door and a structural beam that is supported by the inner panel. More specifically, the reinforcement member(s) described herein are configured for positioning between the inner panel and the structural beam in an interference fit, which obviates any need for mechanical, adhesive, or other such (fixed) connections therebetween and allows for the omission of any openings (e.g., apertures, holes, etc.) in the reinforcement member(s) that would otherwise be required in order to receive fasteners and connect the reinforcement member to the inner panel and the structural beam.

Throughout the following description, the term "inboard" should be understood as referring to elements, components, locations, etc., that are positioned closer to the passenger seating area of the vehicle while the term "outboard" should be understood as referring to elements, components, locations, etc., that are positioned further from the passenger seating area of the vehicle.

With reference to FIGS. 1-9, a vehicle 10 is illustrated with a plurality of vehicle doors 12 according to the principles of the present disclosure, each of which includes: an outer panel 100; an inner panel 200 that is supported by (e.g., connected to) the outer panel 100; a trim panel 300 (FIG. 11) that is supported by (e.g., connected to) the inner panel 200; a window glass 400 that is positioned (located) between the outer panel 100 and the inner panel 200; a handle assembly 500; a window channel 600; one or more structural beams 700; and one or more reinforcement members 800, each of which has an outboard end 802 (FIG. 9) and an inboard end 804. Although generally illustrated and described in the context of a passenger vehicle, it should be appreciated that the vehicle doors 12 described herein may be configured for use with a wide variety of vehicles including trucks, SUVs, vans, etc. Additionally, while the vehicle door 12 is illustrated as a rear door of the vehicle 10, it should be appreciated that the reinforcement member(s) 800 described herein may also be integrated into other areas of the vehicle 10 (e.g., a front door of the vehicle 10, a trunk 14 of the vehicle 10, etc.).

Figure 2:
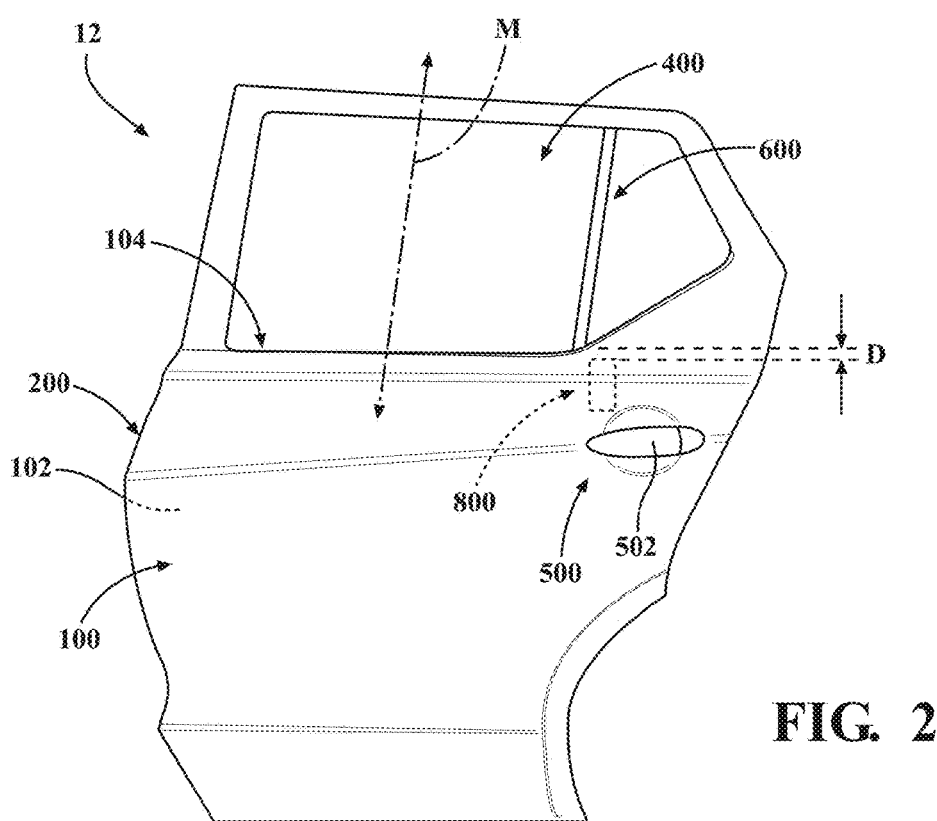
FIG. 2 is a side, perspective view of a (rear) vehicle door on the vehicle, which includes: an outer panel; an inner panel; a trim panel; a window glass; a handle assembly; a window channel; one or more structural beams; and a reinforcement member.
Figure 3:
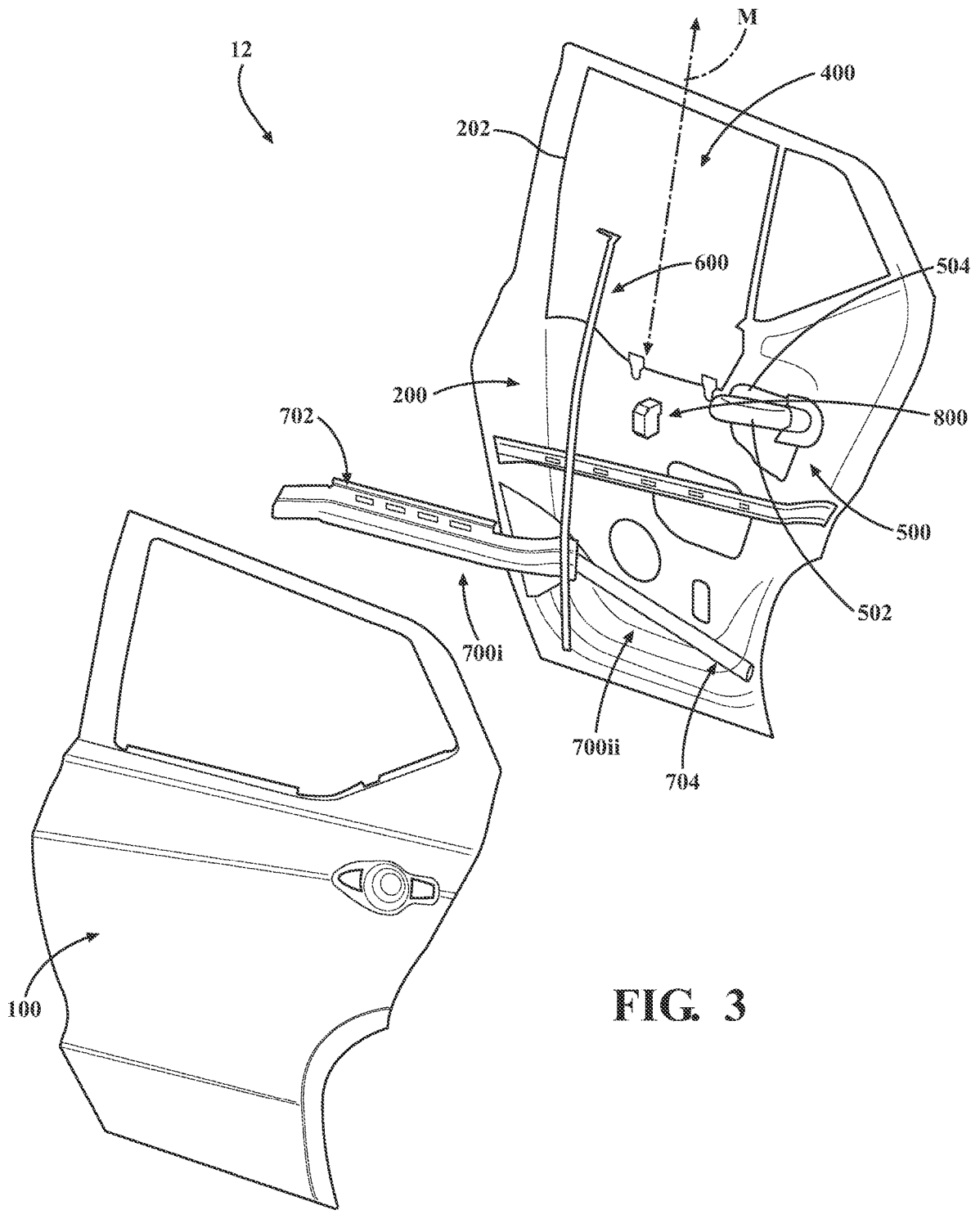
FIG. 3 is a side, perspective view of the (rear) vehicle door seen in FIG. 2 shown with parts separated.
Figure 4:
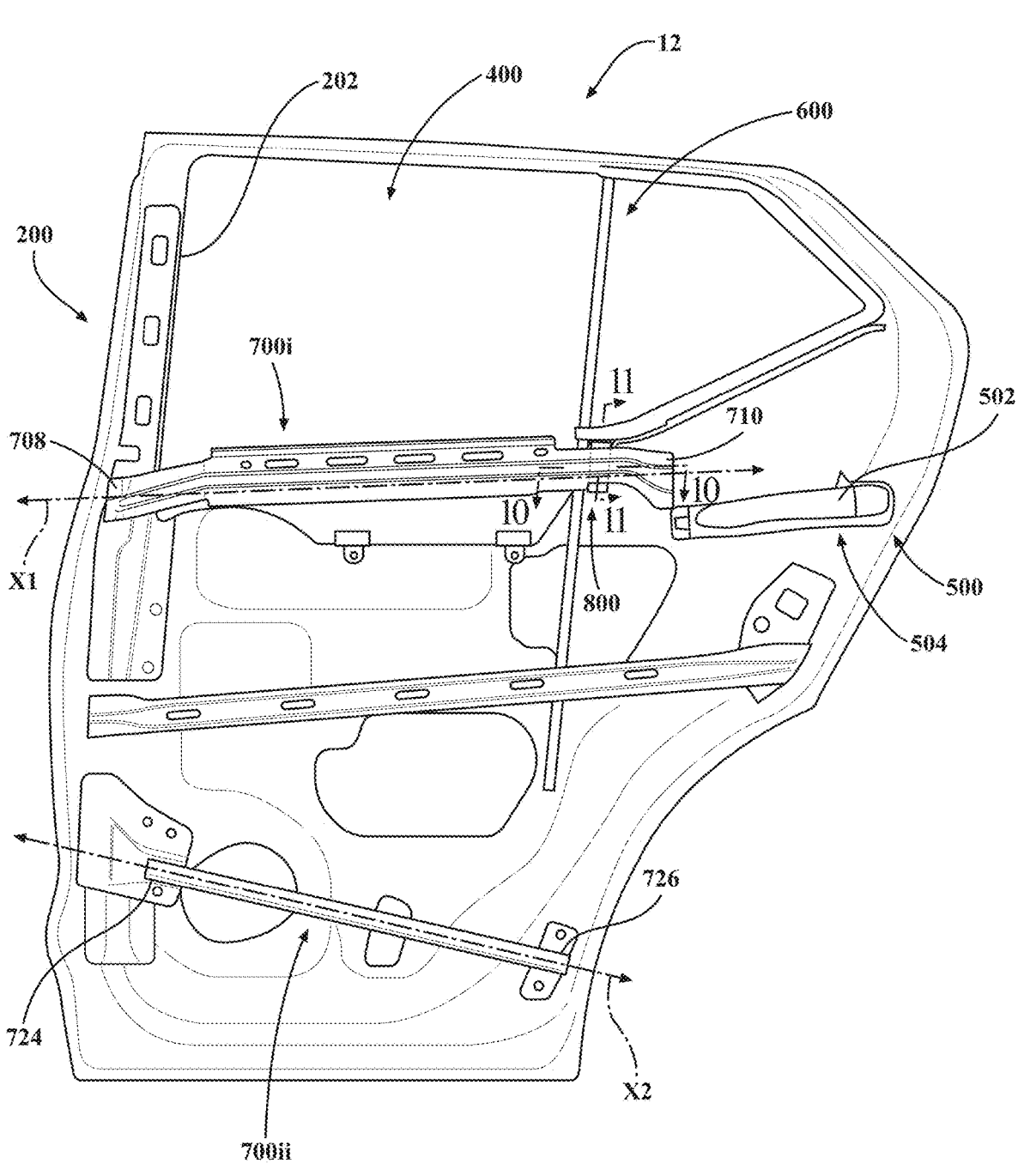
FIG. 4 is a side, plan view of the (rear) vehicle door seen in FIG. 2 upon assembly with the outer panel removed.

In addition to (generally) defining the overall aesthetic appearance of the vehicle door 12, the outer panel 100 conceals and protects the various internal components thereof (e.g., the inner panel 200, the trim panel 300, the window glass 400, the handle assembly 500, the window channel 600, the structural beam(s) 700, and the reinforcement member(s) 800). As seen in FIGS. 2 and 3, the outer panel 100 supports the inner panel 200 and the handle assembly 500 such that the handle assembly 500 extends therethrough, thereby facilitating passenger access to the handle assembly 500. Together with the inner panel 200, the outer panel 100 defines an internal cavity 102 that is configured to receive (accommodate) the various internal components of the vehicle door 12.

The inner panel 200 is located inboard of the outer panel 100 (e.g., closer to a passenger seating area 16 (FIG. 1) within the vehicle 10) such that the inner panel 200 and the outer panel 100 collectively define a window slot 104 (FIG. 2) that extends along (e.g., in (generally) parallel relation to) a length L of the vehicle 10. The inner panel 200 supports the trim panel 300 (FIG. 11), the handle assembly 500, the window channel 600, the structural beam(s) 700, and the reinforcement member(s) 800 and defines a window opening 202 that is configured to receive the window glass 400 such that the window glass 400 is movable within the window channel 600 and the window slot 104 (FIG. 2) along an axis of movement M (FIGS. 2,3).

Figures 6, 7:
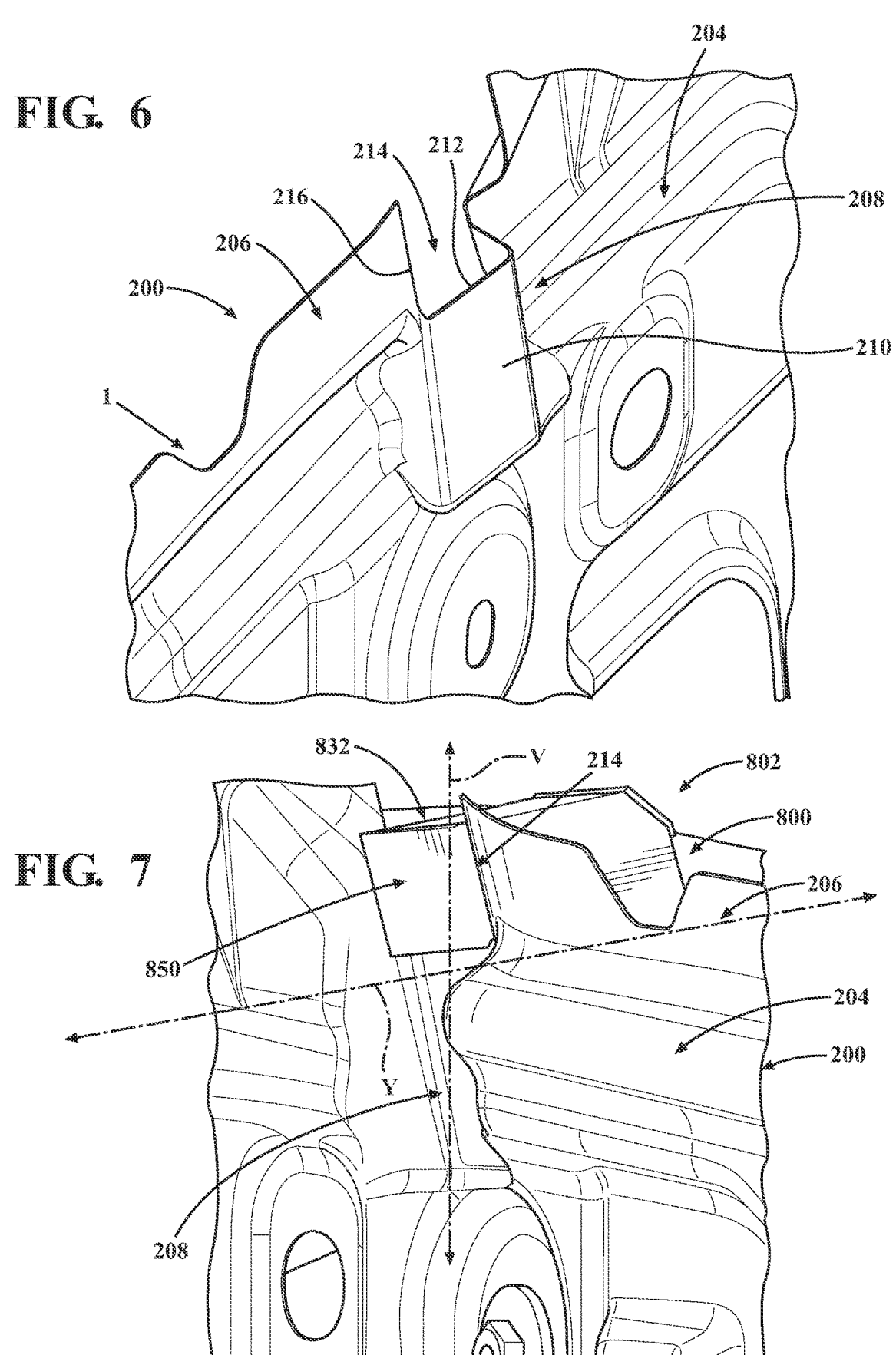
FIG. 6 is a partial, outboard, perspective view of the inner panel.
FIG. 7 is a partial, inboard, perspective view of the inner panel.
Figures 10, 11:
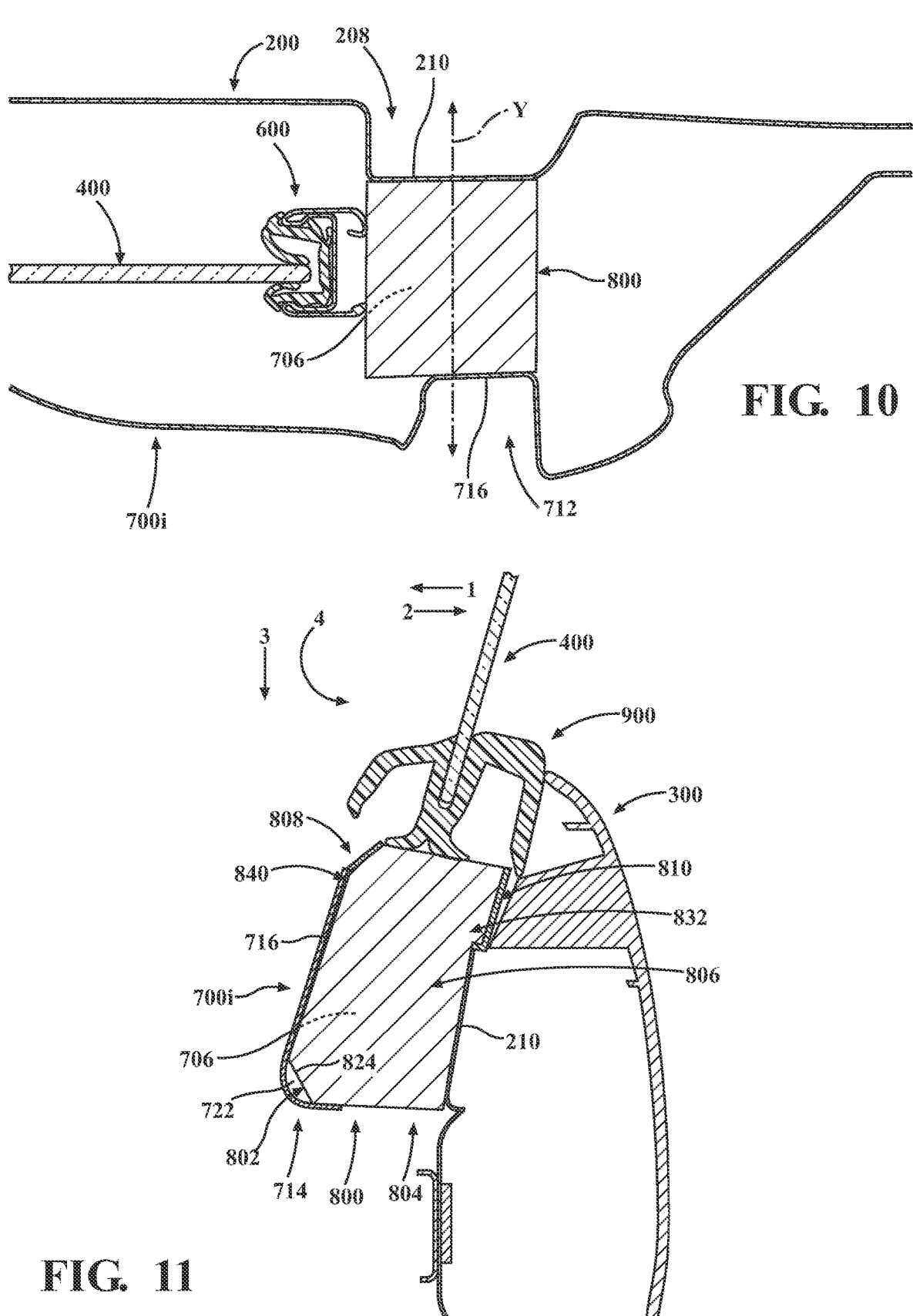
FIG. 10 is a lateral (horizontal) cross-sectional view taken along line 10-10 in FIG. 4 illustrating positioning of the reinforcement member between the inner panel and the structural beam seen in FIG. 8.
FIG. 11 is a vertical cross-sectional view taken along line 11-11 in FIG. 4 illustrating positioning of the reinforcement member between the inner panel and the structural beam seen in FIG. 8.

As seen in FIGS. 6 and 7, the inner panel 200 includes a frame 204 and a flange 206. The frame 204 defines a recess (notch) 208 that extends in an outboard direction (e.g., towards the outer panel 100), which is identified by the arrow 1 (FIGS. 6, 11). The recess 208 includes a (generally) U-shaped transverse (e.g., lateral) cross-sectional configuration and defines a (first) mounting surface 210 with an upper wall 212 (FIG. 6), which is oriented vertically and is configured for engagement (contact) with the reinforcement member 800. The flange 206 extends (vertically) upward from the frame 204 and defines a receptacle 214 that is configured to receive the reinforcement member 800 such that the reinforcement member 800 extends into the inner panel 200, whereby the inner panel 200 supports and inhibits movement of the reinforcement member 800 in multiple directions. More specifically, the inner panel 200 provides both lateral support for the reinforcement member 800 (e.g., along an inboard/outboard axis Y that extends in (generally) parallel relation to a width W (FIG. 1) of the vehicle 10) and vertical support for the reinforcement member 800 (e.g., along an axis V that extends in (generally) parallel relation to the axis of movement M (FIGS. 2, 3) of the window glass 400 and in (generally) orthogonal (perpendicular) relation to the axis Y). Lateral support of the reinforcement member 800 is provided via engagement (contact) with the mounting surface 210 and vertical support of the reinforcement member 800 is provided via engagement (contact) with the upper wall 212 of the mounting surface 210.

In the particular embodiment illustrated, the receptacle 214 is configured as a cutout 216 (or other such opening) that is configured to receive the reinforcement member 800 such that the reinforcement member 800 extends (at least partially) through the inner panel 200. It should be appreciated, however, that the configuration of the receptacle 214 may be varied in alternate embodiments without departing from the scope of the present disclosure. For example, it is envisioned that the receptacle 214 may be configured as a depression that extends into (rather than through) the inner panel 200, whereby the reinforcement member 800 is partially enclosed by the receptacle 214 (on the inboard end 804 thereof).

The handle assembly 500 (FIGS. 2-4) facilitates opening and closure of the vehicle door 12 in a conventional manner. More specifically, the handle assembly 500 includes an (exterior) handle 502 that extends through the outer panel 100 and an (interior) latching assembly 504 that is supported by (e.g., connected to) the inner panel 200 such that the latching assembly 504 is positioned between the outer panel 100 and the inner panel 200.

The window channel 600 (FIGS. 3-5) is supported by the inner panel 200 and extends in a (generally) vertical orientation such that the window channel 600 extends in (generally) orthogonal (perpendicular) relation to the window slot 104 (FIG. 2). The window channel 600 is configured to receive the window glass 400 such that the window glass 400 is movable therethrough, whereby the window channel 600 guides the window glass 400 during movement along the axis of movement M (FIGS. 2, 3) of the window glass 400.

The structural beam(s) 700 are located between the outer panel 100 and the inner panel 200 and add significant (substantial) strength (e.g., rigidity) to the vehicle door 12 (e.g., in the event of a collision, a side impact, etc.). In the particular embodiment illustrated, the vehicle door 12 includes a (first) structural beam 700*i* and a (second) structural beam 700*ii*, each of which is supported by (e.g., connected to) the inner panel 200. More specifically, the structural beam 700*i* is configured as a waist (primary, main) structural beam 702, and the structural beam 700*ii* is configured as guard (secondary, ancillary) beam 704.

The structural beam 700*i* is spaced laterally outward (e.g., outboard) from the inner panel 200 such that a chamber (gap) 706 (FIGS. 5, 10, 11, 16) is defined between the inner panel 200 and the structural beam 700*i*. As described in further detail below, the reinforcement member 800 is configured for insertion into the chamber 706 and defines an outer contour (configuration) mirroring that defined by the chamber 706 so as to utilize the existing geometry of the vehicle door 12.

Figure 8:
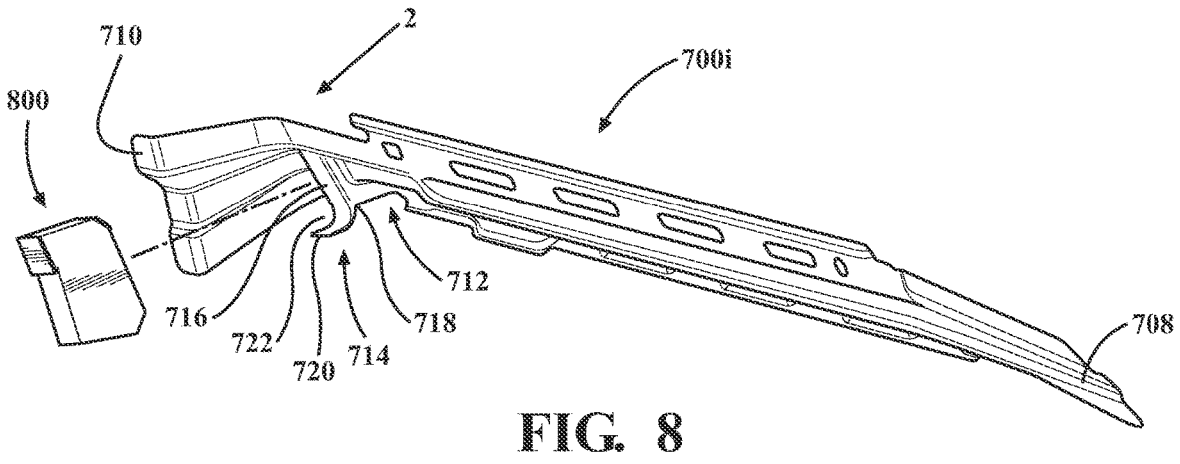
FIG. 8 is an inboard, perspective view of one of the structural beams.
Figure 9:
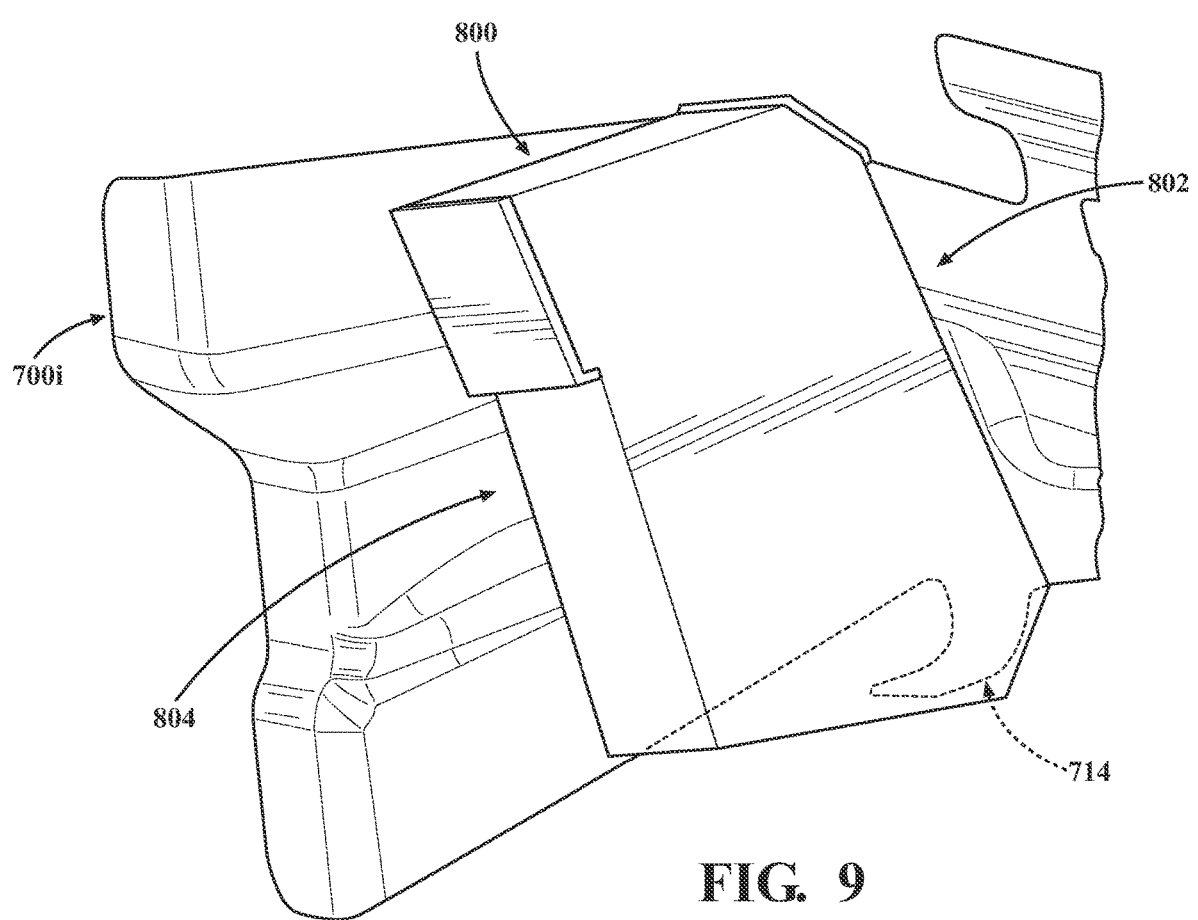
FIG. 9 is a partial, inboard, perspective view of the structural beam seen in FIG. 8 shown with the reinforcement member.

The structural beam 700*i* defines a forward end 708, a rear end 710, and a longitudinal axis X1 (FIG. 5) that extends therebetween. The structural beam 700*i* is configured such that the longitudinal axis X1 extends in (generally) parallel relation to the window slot 104 (FIG. 2) and in (generally) orthogonal (perpendicular) relation to the window channel 600 and the axis of movement M (FIGS. 2, 3) of the window glass 400. The structural beam 700*i* defines a recess (notch) 712 (FIGS. 5, 8) that is located between the ends 708, 710 thereof (and rearwardly of the window channel 600) and includes a support member 714 (FIGS. 8, 11) that is configured to receive the reinforcement member 800. The recess 712 extends in an inboard direction (e.g., towards the inner panel 200), which is identified by the arrow 2 (FIGS. 8, 11). The recess 712 includes a (generally) U-shaped transverse (e.g., lateral) cross-sectional configuration and defines a (second) mounting surface 716, which is oriented vertically in (generally) parallel relation to the mounting surface 210 and is configured for engagement (contact) with the reinforcement member 800. As with the inner panel 200, the structural beam 700*i* supports the reinforcement member 800 and inhibits movement thereof both laterally (e.g., along the axis Y (FIG. 7)) via engagement (contact) with the mounting surface 716 and vertically (e.g., along the axis V (FIG. 7)) via engagement (contact) with the support member 714.

As seen in FIG. 8, the support member 714 extends vertically and laterally from an inboard side 718 of the recess 712 (towards the inner panel 200) and is configured to receive the reinforcement member 800 so as to further support the reinforcement member 800 and inhibit vertical movement thereof (e.g., along the axis V). In the particular embodiment illustrated, the structural beam 700 is configured such that the support member 714 extends continuously from the mounting surface 716 and such that the support member 714 includes a hook 720 that is (generally) J-shaped in configuration. The J-shaped configuration of the hook 720 defines a receiving space 722 that is configured to receive the reinforcement member 800 such that the reinforcement member 800 extends into the support member 714. It should be appreciated, however, that the particular configuration and/or the particular location of the support member 714 may be varied in alternate embodiments without departing from the scope of the present disclosure. For example, depending upon the particular configurations of the structural beam 700*i* and the reinforcement member 800*i*, it is envisioned that the support member 714 may be offset from the mounting surface 716 (e.g., spaced outboard therefrom) and/or that support member 714 may be define a (generally) L-shaped configuration or a (generally) planar configuration.

The structural beam 700*ii* (FIGS. 3, 4) defines a forward end 726, a rear end 726, and a longitudinal axis X2 that extends therebetween and is spaced (vertically) from the structural beam 700*i*. More specifically, the structural beam 700*ii* is configured such that the longitudinal axis X2 defined thereby intersects the longitudinal axis X1 defined by the structural beam 700*i*, whereby the longitudinal axis X2 extends in non-parallel relation to the window slot 104 (FIG. 2) and in non-orthogonal (non-perpendicular) relation to the window channel 600 and the axis of movement M (FIGS. 2, 3) of the window glass 400. Embodiments of the vehicle door 12 in which the structural beams 700*i*, 700*ii* may be configured such that that the respective longitudinal axes X1, X2 defined thereby extend in (generally) parallel relation (e.g., embodiments in which the longitudinal axis X2 extends in parallel relation to the window slot 104 and in orthogonal (perpendicular) relation to the window channel 600 and the axis of movement M), however, are also envisioned herein and would not be beyond the scope of the present disclosure.

With reference to FIGS. 10, 11, 12A, 12B, and 13-16 as well, the reinforcement member 800 will be discussed. While the vehicle door 12 is shown an including a single reinforcement member 800 in the particular embodiment illustrated, embodiments are also envisioned in which the vehicle door 12 may include one or more additional reinforcement members 800. As such, embodiments of the vehicle door 12 including multiple reinforcement members 800 are also envisioned herein and would not be beyond the scope of the present disclosure.

The reinforcement member 800 is configured to inhibit force transmission through the vehicle door 12 (e.g., across the outer panel 100, the structural beam 700*i*, the inner panel 200, the handle assembly 500, etc.) during (in the event of) a side impact by absorbing (dampening) vibrations, shock, etc., and may include any material or combination of materials suitable for that intended purpose. For example, it is envisioned that the reinforcement member 800 may include (e.g., may be formed partially or entirely from) a polymer-based foam material (e.g., expanded polypropylene). By inhibiting such force transmission through the vehicle door 12, the reinforcement member 800 reduces approximation of (e.g., loss in (lateral, inboard/outboard) spacing between) the outer panel 100 and the inner panel 200, thereby inhibiting (e.g., reducing, curtailing) deformation, deflection, or other such damage to the vehicle door 12 (e.g., the outer panel 100, the structural beam 700*i*, the inner panel 200, the handle assembly 500, etc.).

As seen in FIGS. 10 and 11, the reinforcement member 800 is positioned laterally between the inner panel 200 and the structural beam 700*i* (along the inboard/outboard axis Y). More specifically, the reinforcement member 800 is positioned (vertically) above (and is physically separated from) the handle assembly 500 (FIGS. 2-5), rearwardly of the window channel 600 in adjacent relation thereto (e.g., such that the reinforcement member 800 and the window channel 600 are positioned in juxtaposed, contacting relation), and (vertically) below the window slot 104 (FIG. 2) such that the reinforcement member 800 is spaced from the window slot 104 by a distance D that lies substantially within the range of (approximately) 2 mm to (approximately) 4 mm (e.g., (approximately) 3 mm). Embodiments in which the distance D may lie outside this range, however, are also envisioned herein (e.g., depending upon the particular configuration of the reinforcement member 800, the inner panel 200, the structural beam 700*i*, etc.) and would not be beyond the scope of the present disclosure.

The reinforcement member 800 is configured in correspondence with the structural beam 700*i* and the inner panel 200, which allows for use of the reinforcement member 800 with the existing geometry of the vehicle door 12, as indicated above, and obviates any need for redesign of the vehicle door 12 in order to accommodate the reinforcement member 800. As seen in FIGS. 10 and 11, the reinforcement member 800 is in simultaneous and direct physical contact with both the structural beam 700*i* and the inner panel 200. More specifically, the reinforcement member 800 is configured for engagement (contact) with the mounting surfaces 210, 716 respectively defined by the inner panel 200 and the structural beam 700*i* in an interference fit, as described in further detail below. The interference fit created (established) between the reinforcement member 800, the structural beam 700*i*, and the inner panel 200 allows the reinforcement member 800 to be directly supported by the structural beam 700*i* and the inner panel 200 in a manner that obviates any need for mechanical, adhesive, or other such connections therebetween. As such, upon installation of the reinforcement member 800, the vehicle door 12 is devoid of any fixed connections between the reinforcement member 800, the structural beam 700*i*, and the inner panel 200. The interference fit created (established) between the reinforcement member 800, the structural beam 700*i*, and the inner panel 200 also lends additional (vertical) support to the reinforcement member 800, thereby further inhibiting movement (e.g., along the axis V (FIG. 7)), and allows for the omission of any openings (e.g., apertures, holes, etc.) in the reinforcement member 800 that would otherwise be required in order to receive fasteners (e.g., bolts, screws, rivets, pins, etc.) and thereby mechanically connect the reinforcement member 800 to the vehicle door 12. The omission of any such openings not only simplifies manufacturing of the reinforcement member 800, but allows for a solid construction, which increases the strength and the stability of the reinforcement member 800 and the ability of the reinforcement member 800 to inhibit force transmission through the vehicle door 12 (e.g., to the handle assembly 500 (FIGS. 2-5)) by absorbing (dampening) vibrations, shock, etc., in the event of a side impact with the vehicle 10.

The reinforcement member 800 includes: a main body portion 806; an outboard (first) guard 808 that is configured for engagement with the structural beam 700*i*; and an inboard (second) guard 810 that is configured for engagement with the inner panel 200. Whereas the main body portion 806 includes (e.g., is formed partially or entirely from) a first material 812 (FIG. 12A) (e.g., a rigid material) having a first durometer, the guards 808, 810 include (e.g., are formed partially or entirely from) a second, different material 814 (e.g., a deformable material) having a second durometer that is lower than the first durometer, which not only facilitates engagement of the reinforcement member 800 with the structural beam 700*i* and the inner panel 200 in the aforementioned interference fit, but reduces noise. In the particular embodiment illustrated, that main body portion 806 includes (e.g., is formed partially or entirely from) expanded polypropylene and the guards 808, 810 include (e.g., are formed partially or entirely from) ethylene propylene diene monomer. However, depending upon the particular configuration of the structural beam 700*i* and/or the inner panel 200, spatial constraints, the desired performance characteristics of the reinforcement member 800, etc., it is envisioned that the particular materials used in construction of the main body portion 806 and/or the guards 808, 810 may be varied without departing from the scope of the present disclosure.

The guards 808, 810 may be secured (connected, applied) to the main body portion 806 in any suitable manner. For example, it is envisioned that the guards 808, 810 may be applied as an overlay during manufacture of the reinforcement member 800, that the guards 808, 810 and the main body portion 806 may be secured together via an adhesive or double-sided tape, etc.

The main body portion 806 includes an irregular octagonal configuration and defines: an upper inboard side wall 816 (FIG. 12A); a lateral wall 818 that extends laterally outward (e.g., outboard) from the upper inboard side wall 816; a lower inboard side wall 820 that extends (vertically) from the lateral wall 818; a lower end wall 822 that extends laterally outward (e.g., outboard) from the lower inboard side wall 820; a lower beveled (chamfered) wall 824 that extends from the lower end wall 822; an outboard side wall 826 that extends (vertically) from the lower beveled wall 824: an upper beveled (chamfered) wall 828 that extends from the outboard side wall 826; and an upper end wall 830 that extends laterally inward (e.g., inboard) from the upper beveled wall 828 such that the upper end wall 830 extends between the upper beveled wall 828 and the upper inboard side wall 816.

The reinforcement member 800 is configured in correspondence with, and is configured for insertion into, the chamber 706 (FIGS. 5, 10, 11, 16) defined between the structural beam 700*i* and the inner panel 200. As such, in the particular embodiment illustrated, the upper inboard side wall 816 and the outboard side wall 826 extend in (generally) parallel relation, the lower inboard side wall 820 extends in non-parallel relation to the upper inboard side wall 816 and the outboard side wall 826, and the upper end wall 830 and the lower end wall 822 extend in non-parallel relation, which is dictated by the configurations of the structural beam 700*i*, the inner panel 200 and the chamber 706. It is envisioned, however, that the particular configuration of the reinforcement member 800 may be varied in alternate embodiments (e.g., depending upon the particular configuration of the chamber 706) without departing from the scope of the present disclosure.

The upper inboard side wall 816, the lateral wall 818, and the lower inboard side wall 820 are configured such that the reinforcement member 800 (e.g., the main body portion 806) defines a (cantilevered) overhang 832 that extends laterally inward (inboard). As discussed in further detail below, the overhang 832 allows the reinforcement member 800 to be supported by the inner panel 200 of the vehicle door 12 and facilitates creation (establishment) of the aforementioned interference fit between the reinforcement member 800 and the inner panel 200.

The beveled walls 824, 828 extend at acute angles α, β in relation to the lower end wall 822 and the upper end wall 830 so as to define truncated (lower and upper) corner sections 834, 836 of the main body portion 806, respectively. The beveled walls 824, 828 not only increase conformity between the configurations of the chamber 706 (FIGS. 5, 10, 11, 16) and the reinforcement member 800, but facilitate installation of the reinforcement member 800 by creating clearance with the structural beam 700*i* (and/or additional components of the vehicle door 12). For example, as seen in FIG. 11, the configuration of the lower beveled wall 824 allows the reinforcement member 800 to more closely approximate the configuration of the support member 714 on the structural beam 700*i* and facilitates insertion of the reinforcement member 800 into the receiving space 722. Additionally, upon installation of the reinforcement member 800, the beveled walls 824, 828 create additional space for the various components of the vehicle door 12 so as not to interfere with the existing construction, which further obviates any need for redesign of the vehicle door 12 in order to accommodate the reinforcement member 800.

In the particular embodiment illustrated, the reinforcement member 800 is configured such that the angles α, β lie substantially within the range of (approximately) 30° to (approximately) 60° (e.g., (approximately)) 45°. Embodiments in which the angles α, β may lie outside this range, however, are also envisioned herein (e.g., depending upon the particular configurations of the inner panel 200, the structural beam 700*i*, the chamber 706, etc.) and would not be beyond the scope of the present disclosure.

Figure 12A:
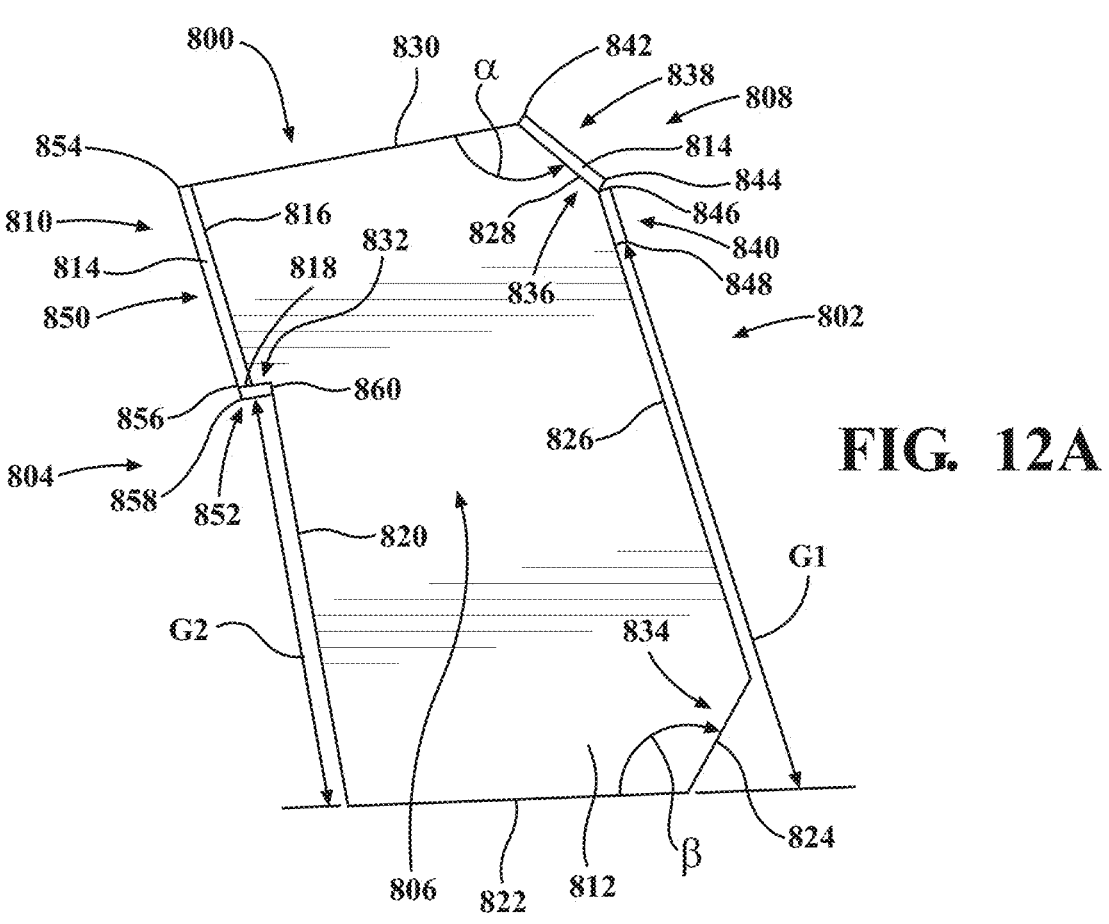
FIG. 12A is a front, plan view of the reinforcement member.

The outboard guard 808 is located at the outboard end 802 of the reinforcement member 800 and includes a (first) segment 838 and a (second) segment 840. More specifically, the segment 838 is secured (connected) to the upper beveled wall 828 and includes respective upper and lower ends 842, 844, and the segment 840 is secured (connected) to the outboard side wall 826 and includes respective upper and lower ends 846, 848, whereby the outboard guard 808 extends from the upper end wall 830 to a point that is located between the upper end wall 830 and the lower beveled wall 824. As seen in FIG. 12A, the segments 838, 840 are positioned in proximate relation such that the lower end 844 of the segment 838 is positioned adjacent to (e.g., in contact with) the upper end 846 of the segment 840.

While the segments 838, 840 are illustrated as discrete components of the reinforcement member 800 in the particular embodiment illustrated, embodiments are also envisioned in which the segments 838, 840 may be integrally (e.g., monolithically) formed from a single piece of material such that the outboard guard 808 is unitary in construction.

The inboard guard 810 is located at the inboard end 804 of the reinforcement member 800 and includes a (third) segment 850 and a (fourth) segment 852. More specifically, the segment 850 is secured (connected) to the upper inboard side wall 816 and includes respective upper and lower ends 854, 856, and the segment 852 is secured (connected) to the lateral wall 818 and includes respective inboard (inner) and outboard (outer) ends 858, 860. As seen in FIG. 12A, the segments 850, 852 are positioned in proximate relation such that the lower end 856 of the segment 850 is positioned adjacent to (e.g., in contact with) the inboard end 858 of the segment 852.

Securing the segment 850 to the upper inboard side wall 816 allows the inboard guard 810 to be positioned between the main body portion 806 and the trim panel 300, as seen in FIG. 11, such that, upon installation of the reinforcement member 800, the inboard guard 810 not only protects the reinforcement member 800 and the trim panel 300 at the point(s) of contact therebetween, but reduces noise. Securing the segment 852 to the lateral wall 818 allows the inboard guard 810 to be positioned adjacent to the overhang 832. Accordingly, upon installation of the reinforcement member 800, the inboard guard 810 is positioned between the lateral wall 818 and the inner panel 200 of the vehicle door 12. More specifically, upon installation of the reinforcement member 800, the segment 852 is positioned between the lateral wall 818 and the upper wall 212 (FIG. 6) of the mounting surface 210.

While the segments 850, 852 are illustrated as discrete components of the reinforcement member 800 in the particular embodiment illustrated, embodiments are also envisioned in which the segments 850, 852 may be integrally (e.g., monolithically) formed from a single piece of material such that the inboard guard 810 is unitary in construction.

As seen in FIG. 12A, upon assembly of the reinforcement member 800, the outboard guard 808 is spaced a first distance G1 from the lower end wall 822 and the inboard guard 810 is spaced a second distance G2 from the lower end wall 822. More specifically, in the particular embodiment illustrated, the reinforcement member 800 is configured such that the first distance G1 is greater than the second distance G2.

Figure 12B:
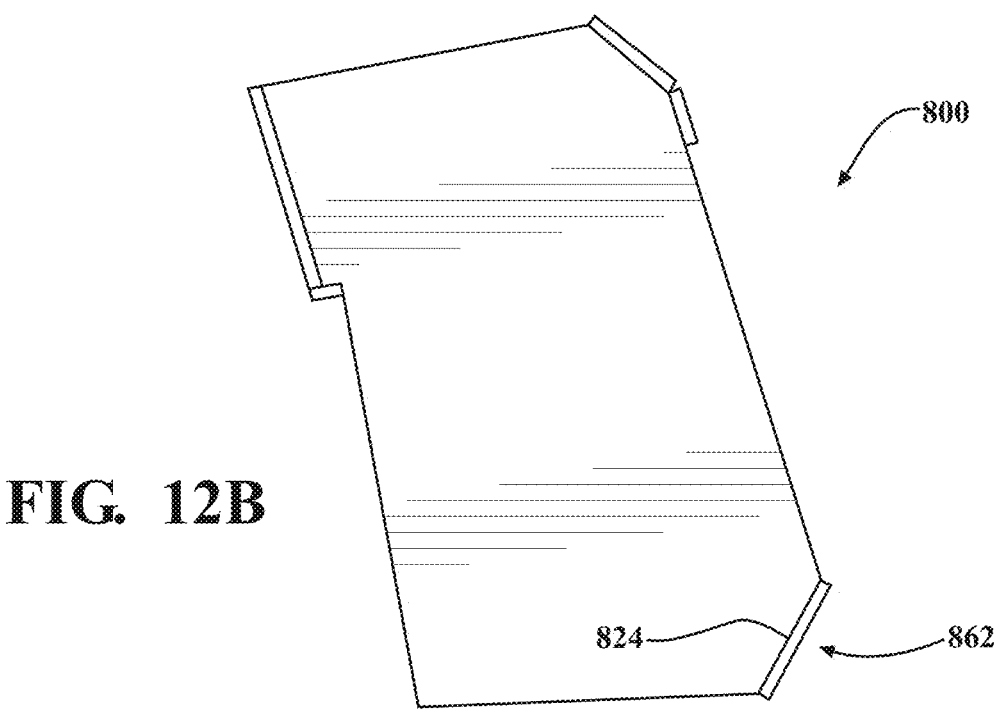
FIG. 12B is a front, plan view of an alternate embodiment of the reinforcement member seen in FIG. 12A.
Figures 13, 14, 15:
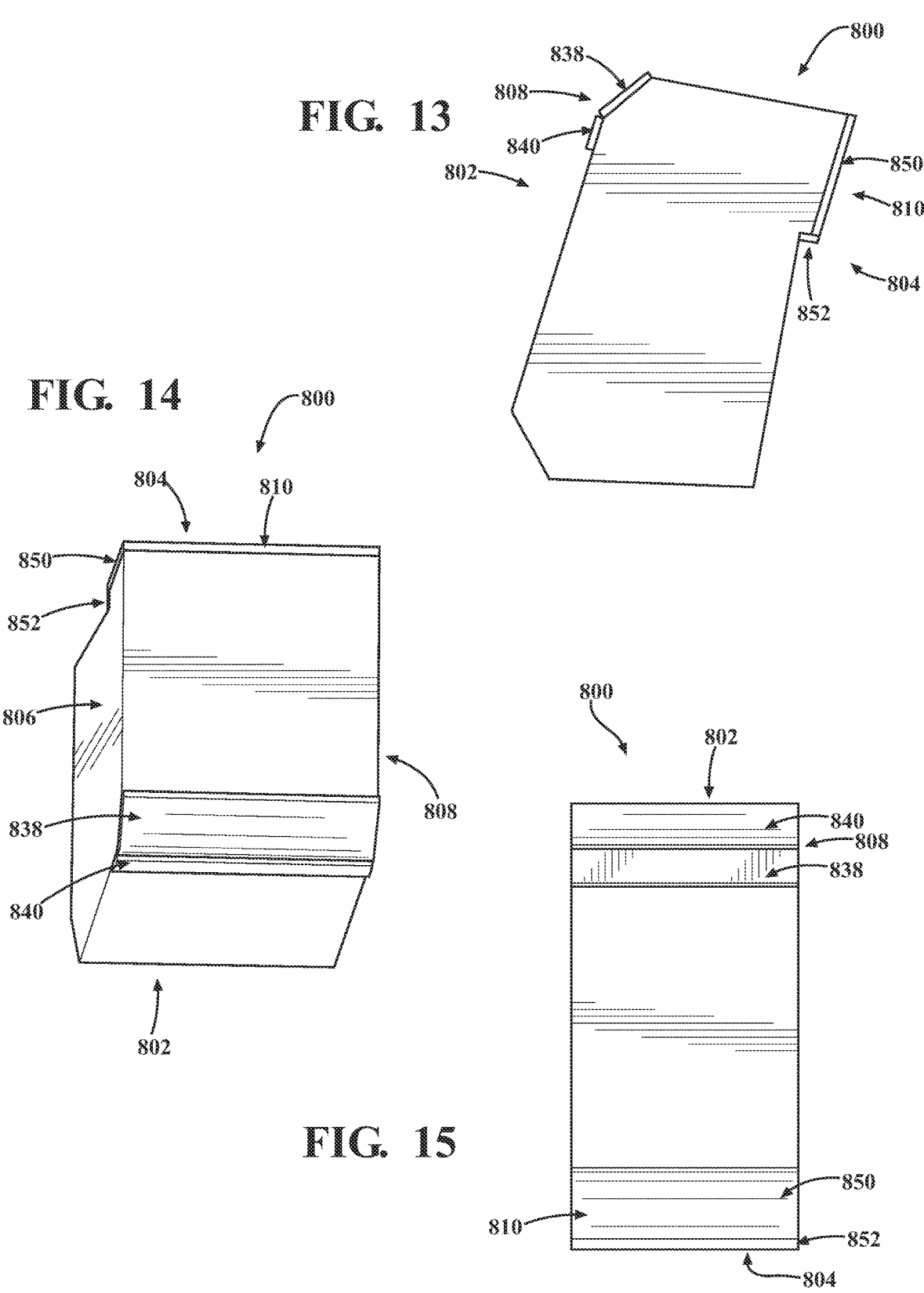
FIG. 13 is a rear, plan view of the reinforcement member.
FIG. 14 is a top, outboard, perspective view of the reinforcement member.
FIG. 15 is a top, inboard, perspective view of the reinforcement member.

In certain embodiments of the disclosure, it is envisioned that an additional outboard (third) guard 862 may be provided and secured to the lower beveled wall 824, as seen in FIG. 12B. In such embodiments, the guard 862 is positioned between the reinforcement member 800 and the support member 714 (FIGS. 8, 11) upon installation of the reinforcement member 800, which not only protects the reinforcement member 800 at the point(s) of contact with the structural beam 700i (e.g., the support member 714), but reduces noise.

With reference now to FIGS. 1-11, 12A, 12B, and 13-16, a method of assembling the vehicle door 12 and installing the reinforcement member 800 will be discussed.

Initially, the handle assembly 500 (FIGS. 3, 4), the structural beams 700i, 700ii, and the trim panel 300 (FIG. 11) are secured (connected) to the inner panel 200, and the window glass 400 is installed such that the window glass 400 is movable within the window channel 600 and the window slot 104.

Thereafter, the reinforcement member 800 is inserted into the chamber 706 (FIGS. 5, 10, 11, 16) in a (vertically) downward direction, which is identified by the arrow 3 (FIG. 11), from an elevated position (vertically) above the inner panel 200 and the structural beam 700i. In the particular embodiment of the vehicle door 12 and the reinforcement member 800 illustrated, it is envisioned that the reinforcement member 800 may be rotated into the chamber 706 during insertion in the direction identified by the arrow 4 in order to account for the existing geometry of the vehicle door 12. More specifically, rotating the reinforcement member 800 allows contact with the various components of the vehicle door 12 (e.g., the trim panel 300, the structural beam 700i, the frame 204 (FIGS. 6, 7) and/or the flange 206 of the inner panel 200) to be reduced (if not eliminated altogether), thereby protecting not only the reinforcement member 800, but the various components of the vehicle door 12.

As can be appreciated through reference to FIGS. 11 and 12A, installation of the reinforcement member 800 is further facilitated by inclusion of the beveled walls 824, 828 and the resultant truncated corner sections 834, 836 of the main body portion 806. More specifically, the beveled walls 824, 828 and the truncated corner sections 834, 836 create increased clearance with the various components of the vehicle door 12, thereby simplifying insertion of the reinforcement member 800 into the chamber 706 and positioning of the reinforcement member 800 between the structural beam 700i and the inner panel 200.

During insertion of the reinforcement member 800 into the chamber 706, the upper inboard side wall 816 (FIGS. 7, 12) and the overhang 832 are inserted into the receptacle 214 (FIG. 7) defined by the flange 206 of the inner panel 200. Continued advancement (and rotation) of the reinforcement member 800 causes the lower inboard side wall 820 to engage (contact) the mounting surface 210 (FIGS. 6, 10, 11) at the inboard end 804 of the reinforcement member 800. The inboard guard 810 (e.g., the segment 852) is, thus, compressed between the lateral wall 818 and the upper wall 212 (FIG. 6) of the mounting surface 210 so as to create (establish) the aforementioned interference fit between the reinforcement member 800 and the inner panel 200, which secures the reinforcement member 800 in relation to the inner panel 200 and reduces noise. Additionally, the reinforcement member 800 is brought into engagement (contact) with the structural beam 700i. More specifically, the lower end wall 822 and the lower beveled wall 824 engage (contact), and are received by, the support member 714, and the outboard end 802 of the reinforcement member 800 (e.g., the outboard side wall 826) engages (contacts) the mounting surface 716 (FIGS. 8, 10, 11). The outboard guard 808 (e.g., the segment 840) is, thus, compressed between the outboard side wall 826 and the structural beam 700i so as to create (establish) the aforementioned interference fit between the reinforcement member 800 and the structural beam 700i, which secures the reinforcement member 800 in relation to the structural beam 700i and the reduces noise. Upon completed installation of the reinforcement member 800, the inner panel 200 and the structural beam 700i thus collectively support the reinforcement member 800 and inhibit movement thereof in multiple directions. More specifically, as indicated above, the various points of contact between the reinforcement member 800, the inner panel 200, and the structural beam 700i inhibit movement of the reinforcement member both laterally (e.g., along the axis Y (FIG. 7)) and vertically (e.g., along the axis V).

Figure 5:
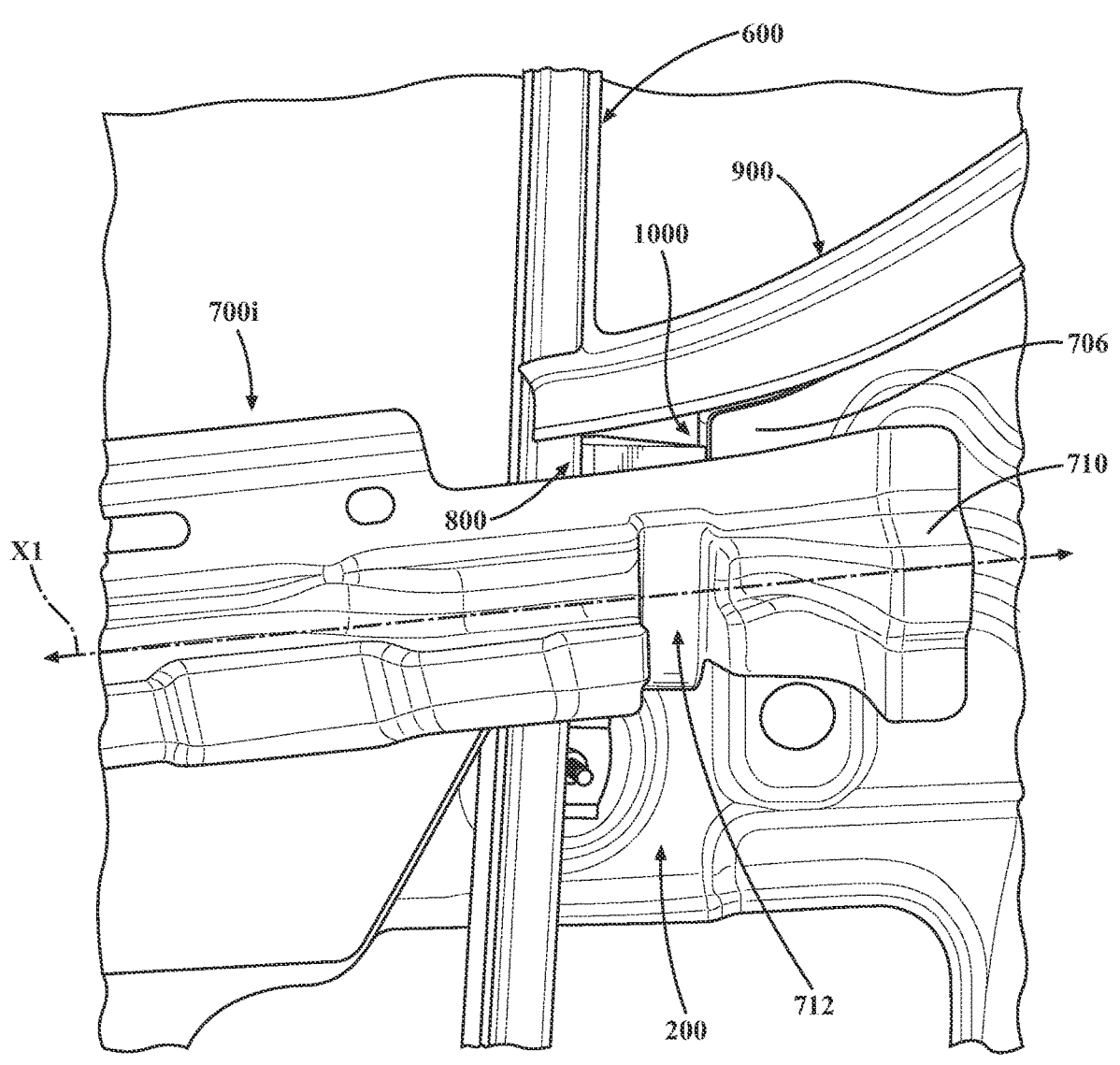
FIG. 5 is an enlargement of the area of detail identified in FIG. 4.
Figure 16:
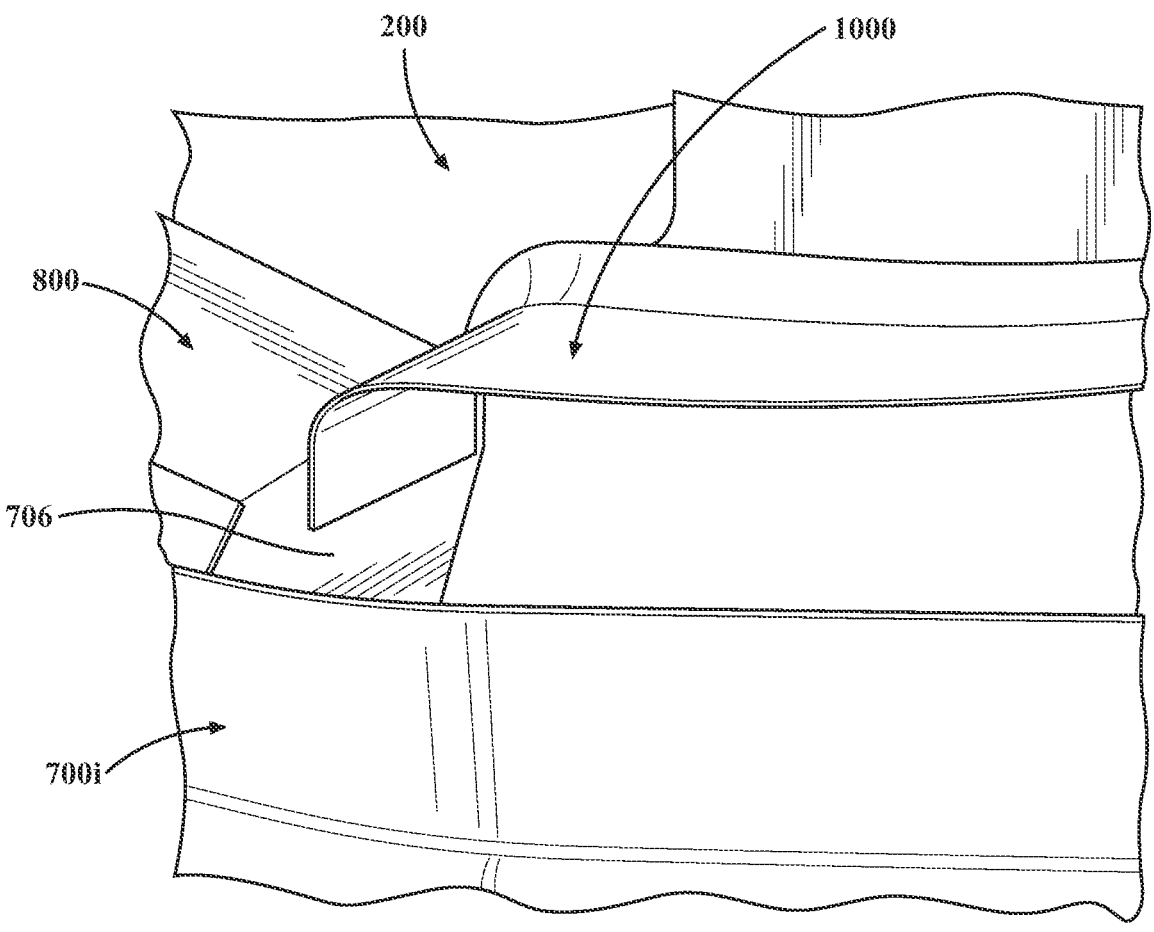
FIG. 16 is a partial, top, outboard, perspective view of the reinforcement member shown positioned between the inner panel and the structural beam and adjacent to a (glass) stopper.

Following installation of the reinforcement member 800 and securement between the inner panel 200 and the structural beam 700i, the window channel 600 (FIGS. 2-5, 10) is installed as well as a weatherstripping 900 (FIGS. 5, 11) and a (glass) stopper 1000 (FIGS. 5, 16) such that the window channel 600, the weatherstripping 900, and the stopper 1000 are positioned in adjacent, contacting relation with the reinforcement member 800. More specifically, the window channel 600 is secured to the inner panel 200 such that the window channel 600 is positioned axially forward of the reinforcement member 800 (e.g., along the length L of the vehicle 10), as seen in FIGS. 5, 10, the weatherstripping 900 is positioned about the window glass 400 and is positioned (vertically) above the reinforcement member 800 and laterally outward (e.g., outboard) of the trim panel 300, as seen in FIG. 11, and the stopper 1000 is secured to the inner panel 200 such that the stopper 1000 is positioned axially rearward of the reinforcement member 800 (e.g., along the length L of the vehicle 10), as seen in FIGS. 5, 16. As such, upon assembly of the vehicle door 12, the reinforcement member 800 is constrained in six degrees-of-freedom by the structural beam 700i, the inner panel 200, the weatherstripping 900, the stopper 1000, and the window channel 600. More specifically, the reinforcement member 800 is constrained in the outboard direction 1 (FIGS. 6, 11) by the structural beam

700_i_, in the inboard direction 2 (FIGS. 8, 11) by the inner panel 200, in the (vertically) upward direction by the weatherstripping 900, in the (vertically) downward direction by the structural beam 700_i_ and the inner panel 200, collectively, in the axially forward direction by the window channel 600, and in the axially rearward direction by the stopper 1000.

The outer panel 100 can then be secured (connected) to the inner panel 200 to conceal and protect the various internal components thereof of the vehicle door 12.

In certain embodiments, the reinforcement member includes a lower end extending inside the hook in an outboard direction.

In certain embodiments, the structural beam includes a support member with a hook, and the reinforcement member is supported by the inner panel and the structural beam such that the reinforcement member extends inside the hook in an outboard direction.

In certain embodiments, the reinforcement member includes a lower end extending inside the hook in an outboard direction and an upper end opposite the lower end.

In certain embodiments, the upper end includes an overhang extending into the receptacle in an inboard direction such that the inner panel supports and inhibits movement of the reinforcement member prior to a side impact.

In certain embodiments, the hook contacts the lower end wall of the reinforcement member prior to a side impact.

In certain embodiments, the support member has a generally J-shaped configuration with a single hook extending in the inboard direction.

In certain embodiments, the reinforcement member extends inside the single hook in the outboard direction.

In certain embodiments, the single hook contacts a lowermost surface of the main body portion of the reinforcement member.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to $180°±25\%$ (e.g., an angle that lies within the range of (approximately) 135° to (approximately)) 225° and the term "generally orthogonal" should be understood as referring to configurations in with the pertinent components are oriented so as to define an angle therebetween that is equal to $90°±25\%$ (e.g., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle door comprising:
an outer panel;
an inner panel located inboard of the outer panel and defining a receptacle;
a structural beam supported by the inner panel, wherein the structural beam includes a support member with a single hook having a generally J-shaped configuration and extending in an inboard direction; and
a reinforcement member supported by the inner panel and the structural beam, wherein the reinforcement member includes a lower end extending inside the single hook in an outboard direction and an upper end opposite the lower end with an overhang extending into the receptacle in the inboard direction such that the inner panel supports and inhibits movement of the reinforcement member prior to a side impact, wherein the reinforcement member is configured to inhibit force transmission through the vehicle door during the side impact and includes:

a main body portion having an irregular octagonal cross-sectional configuration, the main body portion defining:

an upper inboard side wall;

a lateral wall extending outboard from the upper inboard side wall;

a lower inboard side wall extending from the lateral wall;

a lower end wall extending outboard from the lower inboard side wall, wherein the single hook contacts the lower end wall prior to the side impact;

a lower beveled wall extending from the lower end wall;

an outboard side wall extending from the lower beveled wall;

an upper beveled wall extending from the outboard side wall; and an upper end wall extending inboard from the upper beveled wall such that the upper end wall extends between the upper beveled wall and the upper inboard side wall;

a first guard located at an outboard end of the reinforcement member; and a second guard located at an inboard end of the reinforcement member, wherein the main body portion, the first guard, and the second guard are configured as discrete components of the reinforcement member.

2. The vehicle door of claim 1, wherein the first guard extends from the upper end wall to a point located between the upper end wall and the lower beveled wall.

3. The vehicle door of claim 1, wherein the first guard includes:

a first segment secured to the upper beveled wall; and a second segment secured to the outboard side wall.

4. The vehicle door of claim 1, wherein the upper inboard side wall, the lateral wall, and the lower inboard side wall are configured to define the overhang.

5. The vehicle door of claim 4, wherein the second guard includes:

a third segment secured to the upper inboard side wall; and a fourth segment secured to the lateral wall such that the second guard is positioned between the lateral wall and the inner panel of the vehicle door.

* * * * *